United States Patent [19]

Fink

[11] 4,003,531

[45] Jan. 18, 1977

[54] REVERSE FLOW REACTION CONTROL SYSTEM

[75] Inventor: Robert H. Fink, Huntsville, Ala.

[73] Assignee: The United States of America as represented by the Secretary of the Army, Washington, D.C.

[22] Filed: May 6, 1975

[21] Appl. No.: 574,974

[52] U.S. Cl. .............................. 244/3.22; 60/231;
    239/265.23; 239/265.17
[51] Int. Cl.² ....................................... F42B 15/18
[58] Field of Search ............. 244/3.22; 239/265.17, 239/265.23; 60/231

[56] References Cited

UNITED STATES PATENTS

| | | | |
|---|---|---|---|
| 2,799,990 | 7/1957 | Hausmann | 239/265.17 |
| 2,968,921 | 1/1961 | David | 239/265.23 |
| 3,048,973 | 8/1962 | Benedict | 239/265.17 |
| 3,140,583 | 7/1964 | Hopper | 244/3.22 |
| 3,502,285 | 3/1970 | Gambill | 244/3.22 |
| 3,568,954 | 3/1971 | McCarkle, Jr. | 244/3.22 |
| 3,606,165 | 9/1971 | Dunaway | 239/265.17 |

FOREIGN PATENTS OR APPLICATIONS 1,195,859   5/1959   France .................... 239/265.23

*Primary Examiner*—Verlin R. Pendegrass
*Attorney, Agent, or Firm*—Nathan Edelberg; Robert P. Gibson; Harold W. Hilton

[57] ABSTRACT

A control system for providing directional control to a missile during boost phase operation. The kinetic energy of the propellant exhaust gases is utilized to pump a vacuum in an annulus located around the rocket nozzle. To provide a reaction force to guide the missile, a closure is removed from one of several reaction nozzles located around the periphery of the aft end of the rocket and in communication with the vacuum chamber and the atmosphere. A thrust is generated by the air flowing through the reaction nozzle, into the vacuum chamber responsive to opening predetermined reaction nozzles.

1 Claim, 1 Drawing Figure

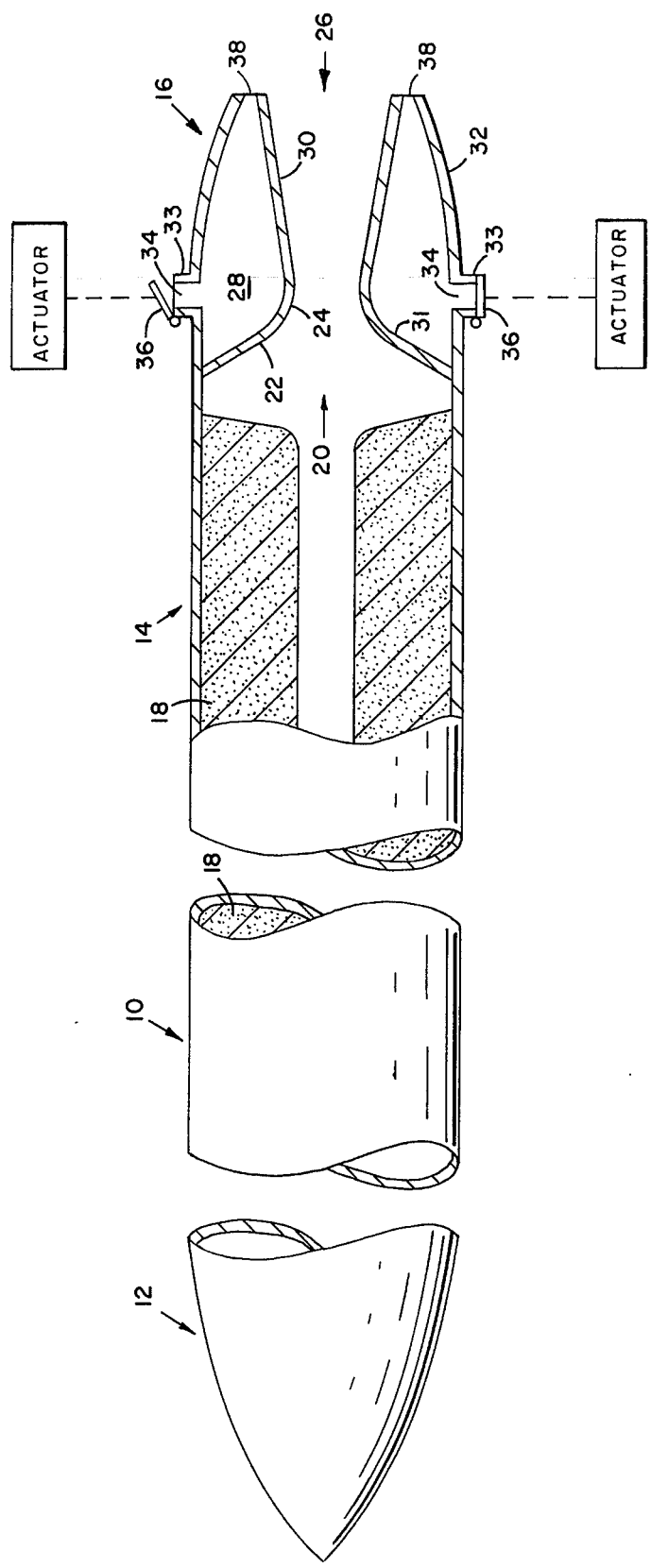

REVERSE FLOW REACTION CONTROL SYSTEM

The invention described herein may be manufactured, used, and licensed by or for the Government for governmental purposes without the payment to me of any royalties thereon.

BACKGROUND OF THE INVENTION

Typically, the directional control concept utilizes an attitude reference provided by a two degree of freedom gyro to obtain missile attitude information used as an input to a conventional control system which generates corrective torques proportional to missile attitude. The directional control principle is utilized to compensate for the three principle directional error source, i.e., (1) linear thrust malalignment or failure of the thrust axis to pass through the rocket center of mass by a certain distance; (2) mallaunch or the unpredictable component of angular motion about a transverse axis at the instant the rocket leaves the laucher; (3) cross wind effect. Stable rockets turn upwind, and the thrust drives the rocket off the intended path.

The corrective torques are usually provided by selectively diverting a portion or all of the thrust producing gases which are directed through the exit throat of the rocket motor. The present inventive concept would not alter the flow of the propulsive gases but merely utilize the kinetic energy of the propulsive gases to produce the restoring torques to provide the directional control.

SUMMARY OF THE INVENTION

Apparatus of the present invention provides directional control to a missile during boost phase operation. The missile includes a body enclosing a propellant and an aft section enclosing a nozzle disposed in communication with the propellant and the atmosphere. An annulus chamber is disposed in the aft end of the body about the nozzle and the nozzle is provided with radially arranged openings in communication with the interior of the annulus chamber and the nozzle. A plurality of reaction nozzles is arranged about the periphery of the aft end of the missile in communication with the interior of the annulus chamber and the atmosphere. Closure members are carried in each reaction nozzle for selectively opening the nozzles whereby the kinetic energy of the propellant exhaust gases draw the air from the atmosphere into the open reaction nozzle to provide a restoring torque on the missile.

BRIEF DESCRIPTION OF THE DRAWING

The single view is an elevational sectional view of a missile employing the principles of the present invention.

DESCRIPTION OF THE PREFERRED EMBODIMENT

As shown in the drawing a missile 10 includes forward, intermediate, and aft sections, 12, 14 and 16, respectively. A fuel 18 is carried in the intermediate section in communication with a nozzle 20 carried in aft section 16. The nozzle includes a converging portion 22, a throat 24 and an exit portion 26. An annulus chamber 28 is disposed about the nozzle with the nozzle wall 30 forming the interior wall of the annulus chamber 28. The forward wall 31 of the annulus is disposed between the propellant and annulus chamber 28. The exterior wall 32 is formed by the exterior shell of the aft section 16 of the missile. A plurality reaction nozzles 33 having openings 34 is disposed in the exterior wall 32 in communication with the atmosphere and the annulus chamber. Closure members 36 are mounted in each of the openings 24 to selectively open and close openings 34. A plurality of apertures 38 is provided between walls 30 and 32 in communication with the annulus chamber and the atmosphere. The principle of operation utilizes the kinetic energy of the propellant exhaust gases to pump a vacuum in annulus chamber 28 located around rocket nozzle 20. When it is necessary to provide a reaction force to guide the missile one of closure members 36 is removed from one of the several reaction nozzles 33 located around the periphery of vacuum chamber 28 and a thrust is generated by the air flowing through the reaction nozzle into the vacuum chamber. The vacuum chamber is continuously evacuated by the ejector action of the nozzle. The design of the ejector conforms to standard practice. The reaction nozzle may be canted to provide roll control if desired. The signals to the reaction jet nozzles are provided by any conventional means such as a gyroscope. Opening and closing of the reaction jet ports is accomplished by poppets, pintles or other conventional means.

While a solid propellant motor is shown in the sketch, this invention would apply to all forms of chemical propulsion.

I claim:
1. A directional control system for maintaining a missile on a launch predetermined path comprising:
   a. a body having forward, intermediate, and aft sections, said intermediate section enclosing a propellant and said aft section enclosing a nozzle in communication with said propellant;
   b. an annulus chamber carried in said aft section around said nozzle means for creating a vacuum in said chamber comprising an opening at the aft most end thereof whereby the kinetic energy of the burning propellant exhaust gases pump a vacuum in said annulus chamber, said annulus chamber having openings at predetermined positions around the periphery thereof for communication of said chamber with the atmosphere;
   c. closure means in each said opening; and,
   d. activating means for moving said closure means to selectively open said openings, whereby responsive to opening of said annulus chamber at said predetermined positions air is directed into said vacuum chamber at said predetermined position to create a control force on said missile.

* * * * *